United States Patent
Rausch et al.

[11] Patent Number: 5,562,379
[45] Date of Patent: Oct. 8, 1996

[54] VIBRATION RESISTANT PIN AND COLLAR FASTENER

[75] Inventors: James G. Rausch, Torrance; Rosendo Lomeli, Whittier; Petrus Ioan, Anaheim, all of Calif.

[73] Assignee: Hi-Shear Corporation, Torrance, Calif.

[21] Appl. No.: 197,390

[22] Filed: Feb. 16, 1994

[51] Int. Cl.[6] .................................................. F16B 19/00
[52] U.S. Cl. .................................... 411/361; 411/411
[58] Field of Search ................................ 411/361, 307, 411/411, 415

[56] References Cited

U.S. PATENT DOCUMENTS

| | | | |
|---|---|---|---|
| 2,679,774 | 6/1954 | MacDonald | 411/415 X |
| 3,805,863 | 4/1974 | Starr | 411/361 X |
| 3,915,052 | 10/1975 | Ruhl | 411/361 |
| 4,326,825 | 4/1982 | Volkmann et al. | 411/361 X |
| 4,768,908 | 9/1988 | Fauchet | 411/361 X |
| 5,188,496 | 2/1993 | Giannuzzi | 411/411 X |
| 5,252,016 | 10/1993 | Schmid et al. | 411/411 X |

Primary Examiner—Jerry Redman
Attorney, Agent, or Firm—Donald D. Mon

[57] ABSTRACT

A vibration resistant fastener comprising a pin and a collar. The pin is threaded or peripherally grooved. At a central location, the major diameter of the thread or groove is reduced to a diameter which is still larger than its minor diameter. A collar is threaded or swaged on to the pin and collar material is pressed into an open region that was formed by the reduction of the major diameter, to form a thread lock.

6 Claims, 2 Drawing Sheets

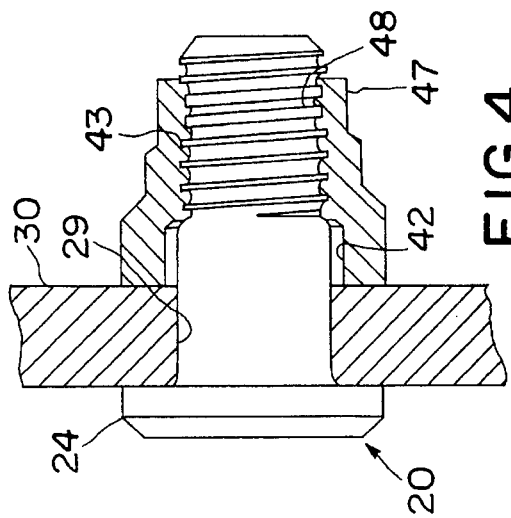
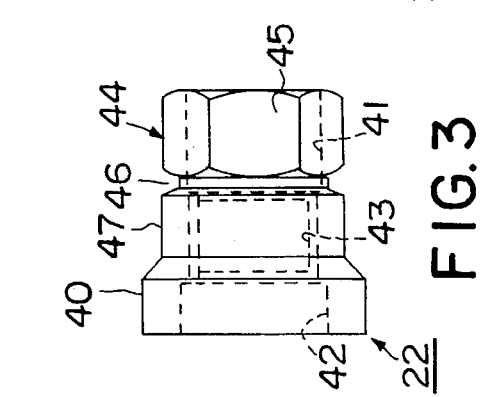
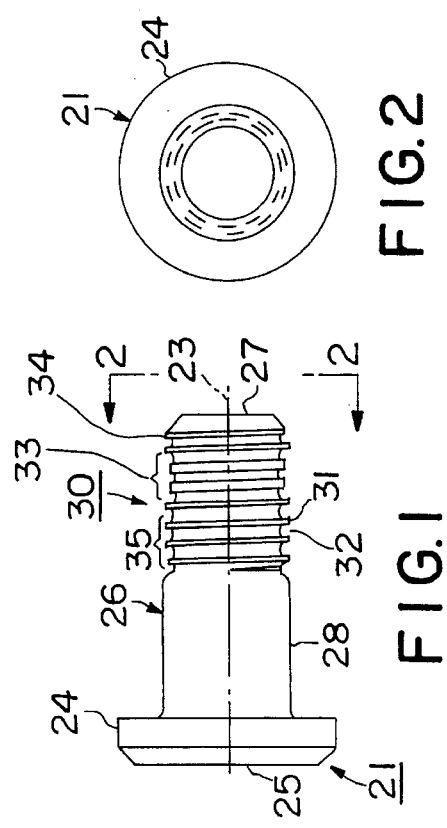
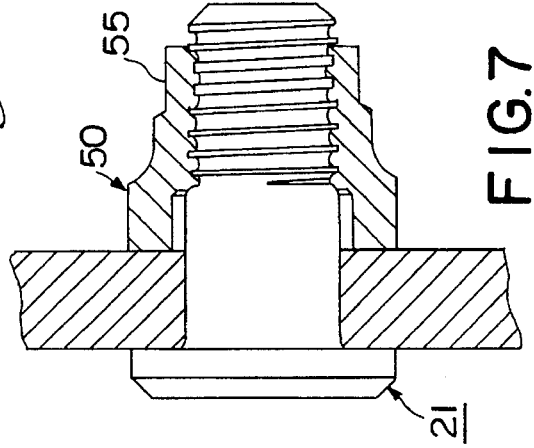
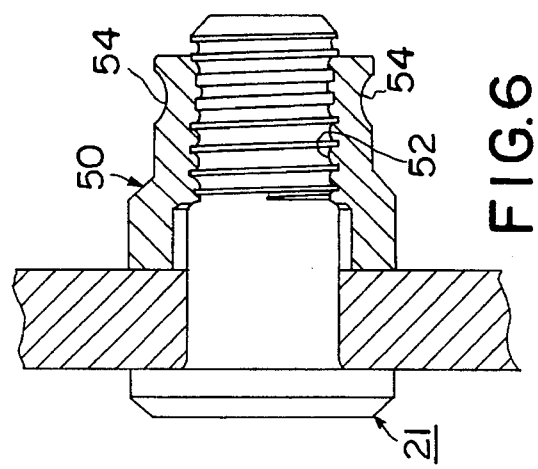
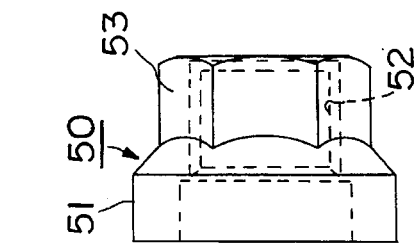

5,562,379

VIBRATION RESISTANT PIN AND COLLAR FASTENER

FIELD OF THE INVENTION

This invention relates to structural fasteners of the type which comprises a pin and a collar attachable to the pin, the pin having means whereby the collar, once set, can be locked against removal, especially against severe vibrational forces.

BACKGROUND OF THE INVENTION

Structural fasteners of the pin-and-collar type are widely used in highly stressed joinders, such as in the assembly of aircraft. Such fasteners employ a grooved pin and a collar. When the groove in the pin is a thread, the collar is internally threaded in the nature of a nut. When the groove or grooves are in a plane normal to the axis of the pin, the collar usually has an internal cylindrical surface, which is swaged into the groove or grooves. Both types of fastener can be employed with this invention. In many, even most, such installations, when the fastener is installed correctly with the correct residual tension in the pin, it will be sufficiently resistant to vibration without further provisions to resist or prevent removal.

There are other installations where additional features are required to resist loosening or loss of the collar as the consequence of cyclic forces. One well-known example of a fastener which includes such an additional feature is shown in Starr U.S. Pat. No. 3,805,863. This fastener has functioned well for many years in environments where the vibrational forces are very severe, and in which loss of the collar can result in serious risk. For example, in jet engine intake structures the release of the collar into the engine can be dangerous.

As good as it is, the Starr fastener requires a third part, which leads to complications in manufacture and installation. It may also include the penalty of additional weight.

It is an object of this invention to provide a pin and collar fastener which can be installed with conventional tooling, which comprises only the pin and the collar, and which is resistant to very high vibrational forces. When the fastener includes a thread, it is resistant to substantial torque which would tend to loosen the fastener.

BRIEF DESCRIPTION OF THE INVENTION

A fastener according to this invention comprises a pin and a collar. The pin has a longitudinally-extending central axis. The pin includes a circularly cylindrical shank having a head at its first end, and retention means at its second end. In one embodiment the retention means is a modified helical thread. In another embodiment the retention means is a series of circular grooves. In both embodiments, these means have a major diameter forming a crest, and a minor diameter forming a bottom. In both embodiments, over a limited axial length the major diameter is reduced to a dimension intermediate between the major and minor diameters, still leaving at least some unmodified crest at the second end, and some part of the thread to be engaged by the collar in the modified region.

The collar for the threaded pin includes an internal thread proportioned properly to engage an unmodified thread. The collar for the grooved embodiment has a circularly cylindrical inner wall.

In the threaded embodiment, the collar is properly torqued, and then is crimped or swaged to deform displace a portion of the collar into the modified thread. In the swaged embodiment, the collar is swaged to fill all of the grooves, both the modified and unmodified forms in both arrangements, the reduction of the crest diameter has created a peripheral open region into which collar material is displaced to form a thread lock. The term "thread lock" is used to describe the displaced material in both embodiments. It is unable to pass either the unmodified grooves or thread at the unheaded end of the pin. As a consequence, a deformed portion of the collar cannot pass over the unmodified retention means at the second end of the fastener so that the collar is locked onto the pin.

According to an optional feature of the invention, the threaded collar can be set by means of a torque-off drive section, the remainder of the collar remaining set on the pin. Then the collar can be swaged or crimped to its final locked condition.

The above and other features of this invention will be fully understood from the following detailed description and the accompanying drawings, in which:

BRIEF DESCRIPTION OF THE DRAWINGS

FIG. 1 is a side view of one embodiment of a pin according to the invention;

FIG. 2 is an end view of FIG. 1 taken at line 2—2 therein;

FIG. 3 is a side view of one embodiment of a collar according to the invention;

FIG. 4 is an axial cross-section showing the pin and collar of FIGS. 1 and 2, installed;

FIG. 5 is a side view of another embodiment of a collar;

FIG. 6 is an axial cross-section showing the collar of FIG. 5 crimped onto the pin of FIG. 1;

FIG. 7 is an axial cross-section showing the collar of FIG. 5 swaged onto the pin of FIG. 1;

DETAILED DESCRIPTION OF THE INVENTION

Figure 10:
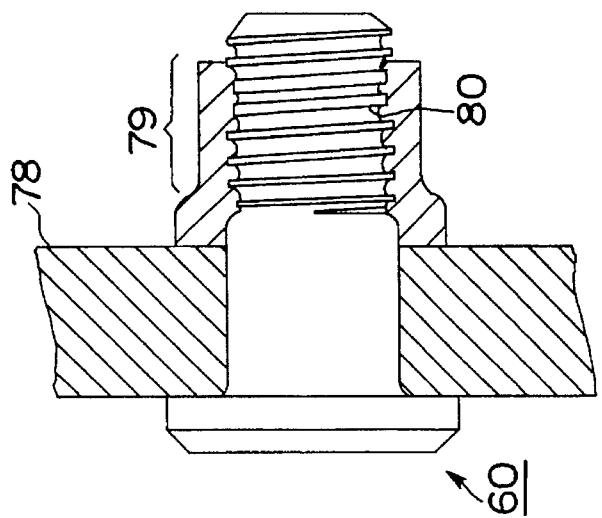
FIG. 10 is an axial cross-section showing the pin and collar of FIGS. 8 and 9, installed.

A fastener 20 according to this invention comprises a pin 21 and a collar 22. Pin 21 has a central axis 23 and a head 24 at its first end 25. It has a shank 26 that extends from the head toward the second end 27. A circularly cylindrical section 28 is dimensioned to fit properly in a hole 29 in a workpiece 30 (FIG. 4). The workpiece is shown as a single piece, although the fastener will generally be used to join two or more parts together.

Pin 21 further includes retention means 30. In the embodiment of FIG. 1, means 30 is a helical thread with a major diameter forming a crest 31 and a minor diameter forming the bottom 32 of a helical groove. The thread extends to the second end in a conventional manner.

According to this invention, the thread is modified by providing a reduced crest diameter, between the major and minor diameter, to form a modified thread section 33 disposed between at least one complete convolution 34 at the second end, and at least three fully formed convolutions 35 on the side toward the head, which must project beyond the material grip range of the pin.

Collar 22 has a body 40 with an internal passage 41. A counterbore 42 will face the workpiece to accommodate any unthreaded portion of the shank which protrudes beyond the workpiece. An internal thread 43 is dimensioned to make a proper fit with the unmodified portion of the thread on the pin.

In the preferred embodiment of the collar, a drive section 44 has a wrench-engaging array 45 of surfaces, preferably hexagonal. A frangible reduced section 46 joins the drive section to the remainder of the body. This is the well-known HILOK fastener produced by Hi-Shear Corporation of Torrance, Calif. Full details for this collar will be found in George S. Wing U. S. Pat. No. 2,940,495, which is incorporated herein by reference for its showing of such a collar.

An externally cylindrical section 47 resists engagement by a wrench to prevent unauthorized removal after the drive section has torqued off. It also provides a region for swaging or crimping, as will be described.

The completed assembly of pin 21 and collar 22 is shown in FIG. 4. After having been properly tightened, the drive section has torqued off. Thereafter, part of section 47 has been swaged inwardly to deform the inside wall of the collar so as to fill the open region left by the modified thread, this creates an internal shape 48 that cannot pass the crest of the convolution 34. This firmly locks the collar to the pin.

If instead of a torque-off drive section it is desired to drive the body directly, a collar 50 shown in FIG. 5 will be used which does not include one. This collar comprises a body 51, an internal thread 52 to engage the thread on the pin, and external wrench-engaging surfaces 53. These surfaces will be engaged by the torque tool.

Unlike the collar of FIG. 4, collar 50 has no circular section for swaging (although it may). Instead, as shown on FIG. 6 the body of the collar may be crimped as shown by dimples 54. Or the hexagonal section could be swaged as shown in FIG. 7 by reduced surface 55. In both situations, a lock is produced as in FIG. 4.

For swage-type installations, pin 60 has a central axis 61, a head 62 at its first end 63, and a shank 64 extending to its second end 65. Instead of a helical groove formed as a thread, this embodiment has a series of adjacent circular grooves 66. Such grooves have a crest 67 with a major diameter, and a bottom 68 with a minor diameter, except for one or mope grooves which are modified by a reduced crest 69 having a diameter between the major and minor diameter. These modified grooves are otherwise identical to the others.

The modified section is formed between an unmodified fully formed complete convolution crest or crests 70 at the second end, and at least one unmodified fully formed complete convolution crest 71 at the side toward the head. At least three unmodified crests 71 should preferably remain.

Collar 75 has a circular outer wall 76, preferably cylindrical, and a cylindrical inner wall 77. When it is swaged onto the pin against workpiece 78 to form a swaged section 79, a locking portion 80 fills the open region left by the modified crests. This deformed portion cannot pass crest 71. The collar is therefore firmly locked to the pin.

Figure 9:
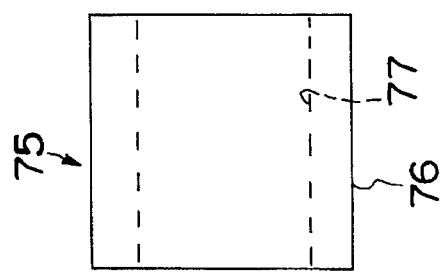
FIG. 9 is a side view of a collar adapted for use with the pin of FIG. 8.
Figure 8:
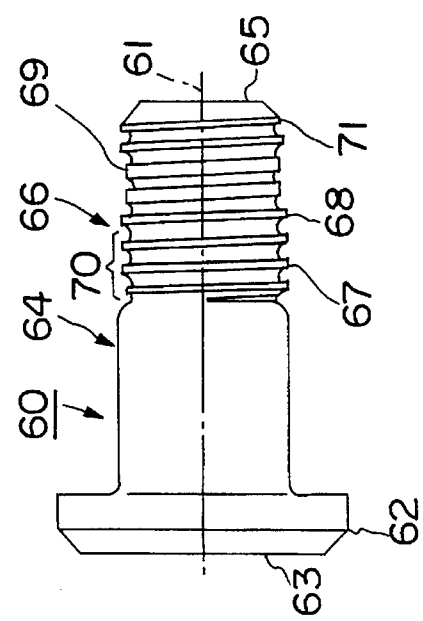
FIG. 8 is a side view of another embodiment of a pin according to the invention.

The threaded pin 21 of FIG. 1 can also be used with the collar 75 of FIG. 9 for a swaging joinder. Often this combination will be preferred to that which is shown in FIGS. 8–10. All of the criteria explained above applies to this combination as well.

It will be appreciated that this fastener can be assembled with conventional tooling, and is firmly locked against removal by vibrational forces, using only a pin and a collar without requiring additional parts to lock the fastener.

The reason for providing at least three fully formed convolutions or three full grooves between the cylindrical portion of the shank and the modified portion is because a very large proportion of the tensile force on the shank is transferred by them. The reason for providing at least one fully formed convolution of full groove adjacent to the second end is to provide a sufficient barrier to the unthreading of the collar, or of its being removed by an axial pull.

The modification of the crests is not intended to create a smooth-bottomed groove. Instead, a substantial part of the base portion of the thread on the pin is installed to be retained, and to be engaged by the deformed portion of the collar. As a consequence, a sufficient lock against removal is created, at the same time providing at least some additional resistance against axial separation.

A reduction in height of the crest by about 30% to 60% is suitable. For example on a 0.250-28 thread having a 0.250 inch major diameter and a 0.208 inch minor diameter, the diameter of the modified portion would advantageously be about 0.225 inch.

The pin and collar maybe of any suitable metal which can be formed to the described shapes and swaged or crimped to make the appropriate deformation.

This invention is not to be limited by the embodiments shown in the drawings and described in the description, which are given by way of example and not of limitation, but only in accordance with the scope of the appended claims.

We claim:

1. A structural metal fastener comprising:

a pin having a longitudinal central axis, a first end and a second end, a head at said first end, a shank extending from said head including an external circularly cylindrical section to fit in a hole in a workpiece, and retention means between said cylindrical section and said second end;

said retention means comprising an external helical thread between the cylindrical section and the second end, said thread having a crest formed by a major diameter and a bottom formed by a minor diameter, a central portion of said thread being modified to form a modified thread by reduction of its crest diameter to a diameter intermediate between said major and minor diameters to form a peripheral open region; and a collar having an infernal thread dimensioned to engage with said thread on the pin with the major diameter of the collar on the thread being engaged to the minor diameter of the thread on the pin in the central portion and on both sides of the central portion, whereby when the collar is applied to the pin, a portion of said collar may thereafter be swaged into said open region and against said modified thread to form a thread lock, there being at least three fully formed thread convolutions on pin adjacent to the cylindrical section, and at least one fully formed thread convolution on said pin adjacent to said second end said thread lock being unable to be threaded past said one fully formed thread convolution on said pin.

2. A fastener according to claim 1 in which wrench-engaging means is provided on the collar.

3. A fastener according to claim 1 in which said collar includes a drive section which bears wrench-engaging surfaces, and is connected to the remainder of the collar by a frangible section which fractures when a predetermined torque is exerted across it.

4. A fastener according to claim 1;

said pin being inserted in the hole in the workpiece with the head in contact with the workpiece and the retention means protruding beyond it, said collar being tightened on said pin, and part of said collar having been displaced into the said open region formed by the modified thread to form said thread lock.

5. A structural metal fastener comprising:

a pin having a longitudinal central axis, a first end and a second end, a head at said first end, a shank extending from said head including an external circularly cylindrical section to fit in a hole in a workpiece, and retention means between said cylindrical section and said second end;

said retention means comprising an external helical thread between the cylindrical section and the second end, said thread having a crest formed by a major diameter and a bottom formed by a minor diameter, a central portion of said thread being modified by reduction of its crest diameter to a diameter intermediate between said major and minor diameters to form a peripheral open region; and a collar having an internal wall dimensioned to engage with said crests on the pin, whereby when the collar is swaged against said crests and modified grooves a portion of said collar is displaced into said open region, whereby to join the collar to the pin and also to form a thread lock, there being at least three fully formed grooves and crests on said pin adjacent to the cylindrical section, and at least one fully formed groove and crest on said pin adjacent to said second end said thread lock being unable to be threaded past said one fully formed groove and crest.

6. A fastener according to claim 5;

said pin being inserted in the hole in the workpiece with the head in contact with the workpiece and the retention means protruding beyond it, said collar being swaged on said pin, filling both the modified and unmodified portions of the series of grooves, a portion in said modified portion providing additional retention against separation of the collar from the pin, and part of said collar having been displaced into the region formed by the modified thread to form said thread lock.

* * * * *